United States Patent
Kingdon (10) Patent No.: US 6,477,379 B2
(45) Date of Patent: Nov. 5, 2002

(54) SYSTEM AND METHOD FOR POSITIONING A MOBILE STATION USING TWO BASE STATIONS

(75) Inventor: Christopher Hugh Kingdon, Garland, TX (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/181,592

(22) Filed: Oct. 28, 1998

(65) Prior Publication Data

US 2002/0132623 A1 Sep. 19, 2002

(51) Int. Cl.[7] .............................................. H04Q 7/20
(52) U.S. Cl. ....................... 455/456; 455/457; 455/422; 455/524
(58) Field of Search ................................. 455/456, 457, 455/439, 524, 422, 436, 502; 342/357.01, 450

(56) References Cited

U.S. PATENT DOCUMENTS

| | | | | |
|---|---|---|---|---|
| 5,963,866 A | * | 10/1999 | Palamara et al. ........... | 455/456 |
| 5,987,329 A | * | 11/1999 | Yost et al. .................. | 455/456 |
| 6,064,885 A | * | 5/2000 | Rouhollahzadeh et al. . | 455/439 |
| 6,108,553 A | * | 8/2000 | Silventoinen et al. ....... | 455/456 |
| 6,108,555 A | * | 8/2000 | Maloney et al. ............ | 455/456 |
| 6,157,842 A | * | 12/2000 | Karlsson et al. ............ | 455/456 |
| 6,256,489 B1 | * | 7/2001 | Lichter et al. .............. | 455/404 |

* cited by examiner

Primary Examiner—William Cumming
Assistant Examiner—Lana Le
(74) Attorney, Agent, or Firm—Jenkens & Gilchrist, P.C.

(57) ABSTRACT

A system and method are provided for determining the location or position of a mobile station (MS) within a digital wireless network when only two base stations are available for time of arrival or other triangulation measurements. A call setup is initiated concurrently with the gathering of timing advance or other such location data on the targeted MS, thereby allowing cell sector information to be collected. This data, along with the locating data, is then reported to a Master Positioning Center where distance calculations are made from the locating data. Positional ambiguities are then resolved with a comparison to the serving cell identity recovered during the call placement to the mobile when the locating data was being taken.

33 Claims, 4 Drawing Sheets

SYSTEM AND METHOD FOR POSITIONING A MOBILE STATION USING TWO BASE STATIONS

BACKGROUND OF THE INVENTION

1. Technical Field of the Invention

The present invention relates to mobile communications, in particular, to a system and method for improving the position estimates for locating a mobile station within a mobile telecommunications system, and, more particularly, to a system and method for resolution of mobile position estimates from as few as two base stations.

2. Description of Related Art

One feature of the emerging field of digital wireless telecommunications receiving increasing development, e.g., Time Division Multiple Access (TDMA), is that of mobile positioning. Clearly, an accurate mobile positioning system would be an attractive feature to subscribers and, undoubtedly, would present cellular telephone providers with additional revenues. However, recent development efforts in mobile positioning are not simply the result of potential commercial gains. Recent legislation requires the implementation of emergency location services, e.g., in some digital wireless systems in the near future, which is most likely the primary catalyst for the recent surge in mobile positioning research and development.

TDMA mobile communications systems can be either inter-cell synchronous or inter-cell asynchronous systems. In other words, the base transceiver stations (BTSs) in an inter-cell synchronous system are accurately synchronized with one another, and the BTSs in an inter-cell asynchronous system are not. More specifically, asynchronous BTSs do not share a common time reference, and their transmissions, therefore, have arbitrary timing relative to each other. An example of an inter-cell synchronous system is the North American IS-95 system. Examples of inter-cell asynchronous systems include the Wideband Code Division Multiple Access (WCDMA) systems proposed in the CODIT, ETSI SMG2 Group Alpha, and ARIB technical specifications and the Global System for Mobile Communications (GSM).

A number of disadvantages exist with inter-cell synchronous systems. One prerequisite for such systems is a high level of synchronization among the various BTSs, within the synchronous system, with the degree of synchronization generally measured in microseconds ($\mu s$).

However, an area in which the synchronous network has shown particular advantage over non-synchronous networks is in mobile positioning applications. Synchronous networks have previously shown a distinct advantage over non-synchronous networks since, by design, the synchronous networks share a reference clock. In particular, when an MS is within communication range of three or more BTSs, the MS can tune or transmit, e.g., an access burst, to the BTSs substantially simultaneously. Time delay of arrival measurements, for example, may then be made by each of the BTSs, and respective MS to BTS distances are then made therefrom. With at least three such measurements in such conventional systems, an accurate position is then easily made by use of triangulation, as is understood in the art.

When BTSs are operating asynchronously, however, the task of location calculation is complicated by the fact that each BTS is operating on clocks independent from one another. Therefore, while one BTS is receiving data on Time slot Number 1 (TN1), for example, a neighboring BTS might be simultaneously receiving on TN3. To make an effective location determination, the respective delay of MS transmission to BTS reception must be ascertained along with the relative TN offset with respect to the other BTSs participating in the location calculations. However, recent advances in asynchronous networks have effectively overcome this disadvantage, resulting in an asynchronous network having an equivalently attractive infrastructure for implementing mobile positioning in the aforedescribed synchronous network.

Mobile stations are, in general, within reception range of a number of BTSs, where a traffic channel is maintained between the mobile station and that BTS exhibiting the best communication characteristics, e.g., signal to interference ratio. As is understood in the art, however, when radio frequency (RF) characteristics decline below a specified level or when RF characteristics from another BTS increase beyond a specific threshold relative to the current BTS with which the mobile station is maintaining the traffic channel, a handover is initiated where another traffic channel is setup between the mobile station and the BTS exhibiting the better communication characteristics and, substantially concurrently, the traffic channel between the mobile station and BTS previously in use is broken.

It is this situation of the MS being within range of a number of BTSs that is exploited in the majority of current positioning techniques. For example, one well known network-based method for determining the position of cellular mobile station is disclosed in commonly-assigned Swedish Patent Application No. 9303561-3 to R. Bodin. In order to determine the position of a mobile station, a handover procedure is initiated between a serving base station and the mobile station. The mobile station transmits access request signals to a new base station. The BTS measures the time delay for the access request signal to travel between the mobile station and the base station. This procedure is repeated between the mobile station and one or more additional base stations. A service node in the cellular network calculates the position of the mobile station by utilizing information about the known positions of the base stations and the measured access time delays.

This network-based method of determining the position of cellular mobile stations relies on asynchronous handovers, where the target base station measures the access delays to the mobile station. Each access delay is used as a measure of the distance between the mobile station and the respective base station. At least two positioning handover operations are therefore needed to obtain three such distances, which can be used in a triangulation algorithm to determine the mobile terminal's position. Notably, one distance can be obtained between the serving base station and the mobile terminal without a positioning handover. For example, in GSM, the Timing Advance (TA) value used for time alignment of bursts can optionally be used as a representation of the distance in the serving cell. A more accurate position determination can be attained if more than two such positioning handovers are made, because more than three distances will be known. The use of more than three distance measurements compensates for some errors arising in the individual measurements.

The positioning handovers are made in sequence, with each handover, e.g., in a GSM network taking approximately 0.5 seconds to complete. In fact, the mobile station's timeout procedure takes about 0.3 seconds alone to complete. Consequently, a shortcoming of the above-described sequential method is that the total time it takes to determine the mobile station's position is proportional to the number of cells in which the positioning handovers are made. However, a more significant disadvantage of this and other similar prior art systems is the fact that no provisions are made for a relatively common positioning scenario when the MS is within range of only two BTSs.

Figure 1:
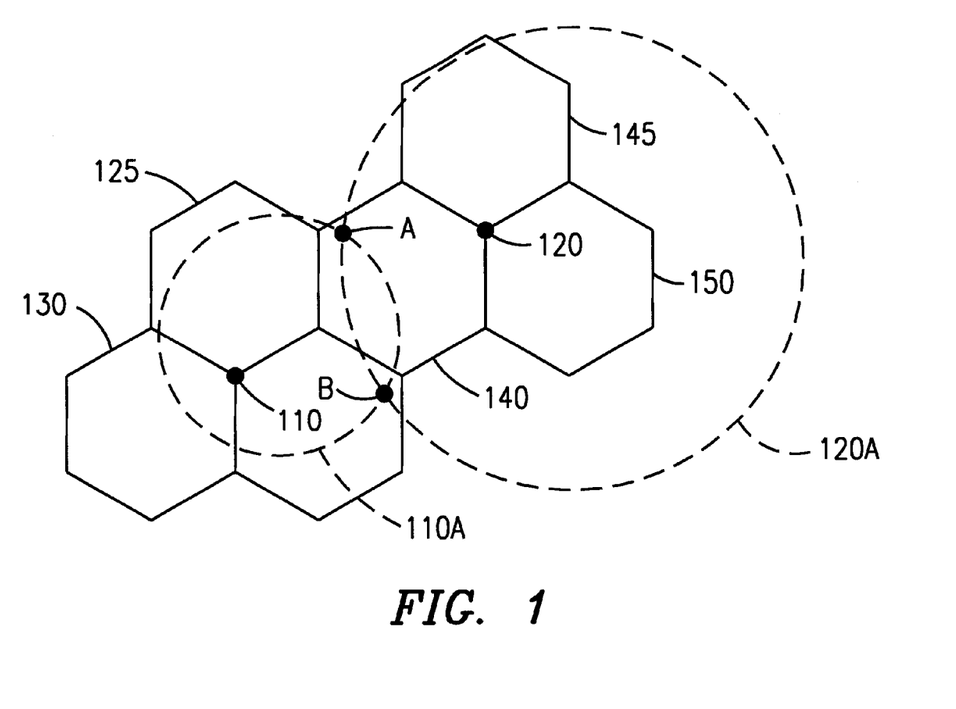
FIG. 1 illustrates a conventional scenario where location estimates between two base transceiver stations are ambiguous.

As is understood in the art, if the MS is in communication range with only two BTSs, an ambiguity of position will exist as the position will, at best, be confined to two distinct geographical locations. With reference now to FIG. 1, there is illustrated a scenario where the MS is only within the communications range of BTSs 110 and 120, respectively. Each of BTSs 110 and 120 employ a three-sectored cell using antennas with pointing azimuths of 120 degrees, as is well understood in the art. Cells 125, 130 and 135 are thereby covered by BTS 110, and cells 140, 145 and 150 are covered by BTS 120. Timing advance measurements from BTSs 110 and 120, represented by the circular distance traces 110A and 120A, respectively, intersect at two points, indicated as A and B in FIG. 1, representing the two possible locations of the MS therebetween. As noted in the figure, point A is within cell 140 and point B, the other positional option, is located within cell 135, located not only at a remote geographical position but within a different cell under the control of a different BTS, and possibly a different Public Land Mobile Network (PLMN) system.

Current time-based positional algorithms and techniques are for the most part unable to accurately determine the position of a mobile station using only two BTSs (unless prohibitively expensive array antennas are employed) and cannot resolve the positional ambiguity illustrated in FIG. 1. Accordingly, only by using three or more BTSs, i.e., by triangulating, are present time-based techniques able to pinpoint the position of a mobile station and resolve the aforedescribed positional ambiguities inherent in a two-BTS measurement, as illustrated and described in more detail in connection with FIG. 3.

Obviously, however, an MS will often be positioned such that communication with three BTSs is unachievable, e.g., due to the geographical distances between the MS and BTSs, a local BTS being inoperative, etc. It is, therefore, desirable that a positioning system have the capability to resolve an MS positional ambiguity using only two BTSs.

It is, accordingly, a first object of the present invention to provide an improved system and method for measuring the position of a mobile station (MS) within a digital mobile telecommunications network.

It is also an object of the present invention to enable measurement of an MS position within the digital mobile telecommunication network when the MS is within the communications range of as few as two BTSs.

It is a further object of the invention to enable measurement of an MS position when the MS is within communications range of only two BTSs operating synchronously or asynchronously.

SUMMARY OF THE INVENTION

In accordance with the present invention, a system and method are provided for determining the location or position of a mobile station (MS) within a digital wireless network when only two base stations are available for time of arrival or other triangulation measurements. A call setup is initiated concurrently with the gathering of timing advance or other such location data on the targeted MS, thereby allowing cell sector information to be collected. This data, along with the locating data, is then reported to a Master Positioning Center where distance calculations are made from the locating data. Positional ambiguities are then resolved with a comparison to the serving cell identity recovered during the call placement to the mobile when the locating data was being taken.

BRIEF DESCRIPTION OF THE DRAWINGS

A more complete understanding of the system and method of the present invention may be obtained by reference to the following Detailed Description when taken in conjunction with the accompanying drawings wherein.

DETAILED DESCRIPTION OF THE PRESENTLY PREFERRED EXEMPLARY EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Figure 2:
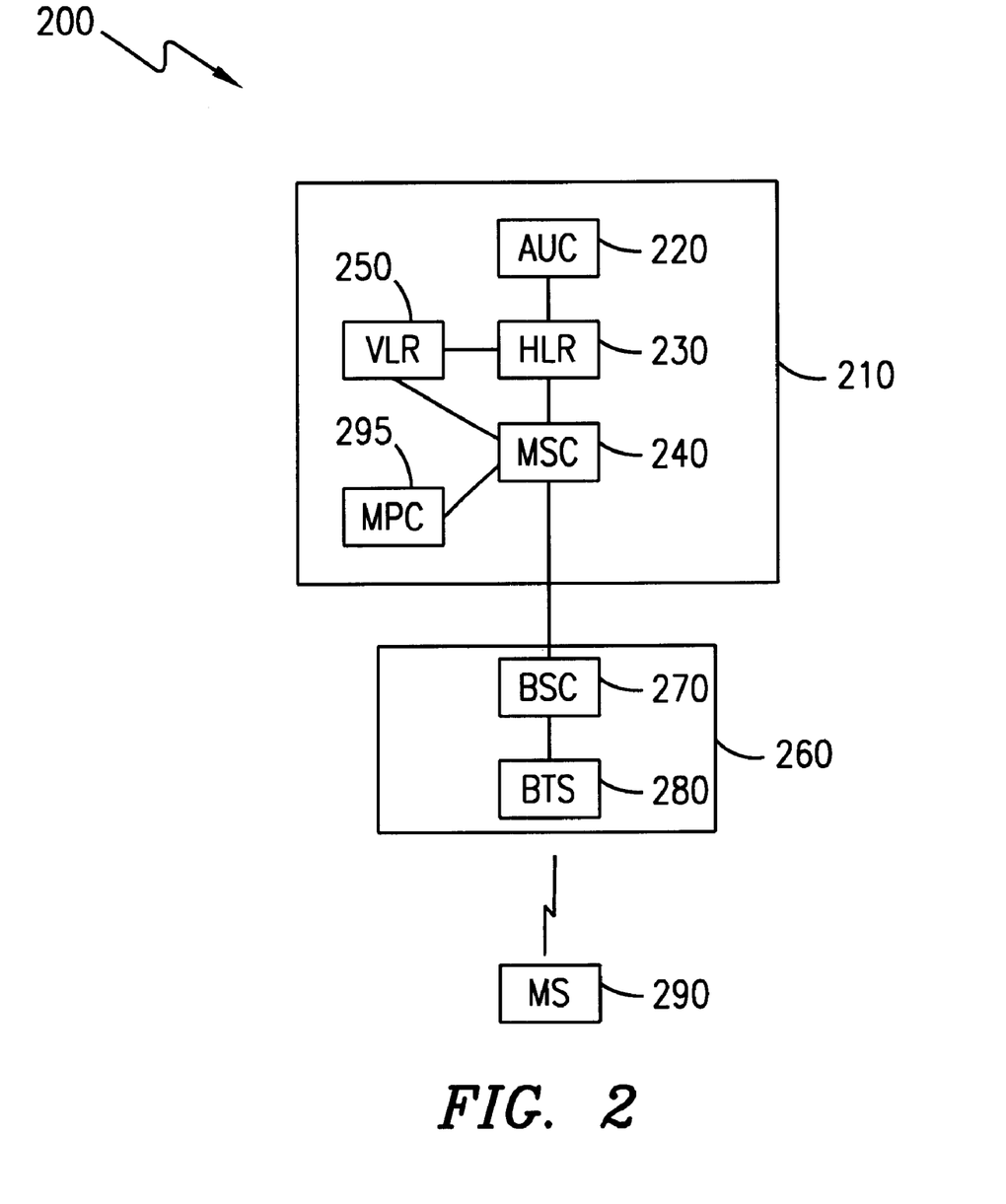
FIG. 2 illustrates a mobile network particularly suited for application of the present invention.

With reference now to FIG. 2, there is illustrated a mobile network 200 particularly suited for application of the present invention. The mobile telecommunication system, as depicted, is essentially divided into two subsystems: a Switching System 210 (SS) and a Base Station System 260 (BSS), each described in more detail hereinbelow and each containing a number of functional subunits therein. The SS 210 includes, for example, an Authentication Center (AUC) 220, a Home Location Register (HLR) 230, a group of Mobile Services Switch Centers (MSCs) 240, only one of which is illustrated, and a Visitor Location Register (VLR) 250. The BSS 260 includes a group of Base Station Controllers (BSCs) 270, each controlling a respective group of Base Transceivers Stations (BTSs) 280. Lastly, a Mobile Station (MS) 290 is in communication with one of the BTSs 280. It should be understood that the aforementioned subunits included in each subsystem are generally located geographically diverse from one another.

As understood by those skilled in the art, the MSC 240 controls calls to and from other telephony and data communication systems, e.g., a Public Switched Telephone Network (PSTN), an Integrated Service Digital Network (ISDN), a Public Land Mobile Network (PLMN), etc. The MSC 240 also controls a number of BSCs 270, where each BSC, in turn, controls a respective group of BTSs 280. Functions controlled by the BSCs 270 include handover and channel assignments.

The mobile network 200 is realized as a network of neighboring radio cells, such as illustrated in FIG. 1, the totality of cells providing a coverage area often referred to as a Service Area (SA). Each cell has a BTS operating on a set of radio channels that are, in general, different from the channels used in neighboring cells. A group of BTSs 280 are controlled by a given MSC 240, and the MS 290 communicates with the mobile network 200 via a radio link between the MS and at least one of the BTSs 280.

A number of databases are required to keep track of the area in which a mobile station currently resides so that a call may be properly routed to or from that MS. Two of the most important databases are the HLR 230 and VLR 250. When a person subscribes with a particular network operator, the subscription is registered in the HLR 230 of that particular operator. The HLR 230 contains subscriber information, e.g., supplementary services and authentication parameters, and information about the general location of the MS, e.g., which MSC of all the MSCs 240 of the network 200 currently services the MS 290. This general location data is dynamic since, as the MS 290 moves within the various cells and service areas of the mobile network 200, it must be updated so that the subscriber using the roaming MS 290 may receive or place calls.

The VLR 250 contains information about the various MSs located in a particular MSC 240. There is, therefore, generally at least one VLR 250 associated with each of the MSCs 240. When an MS 290 moves, or roams, into a new MSC area, the VLR 250 associated with that MSC will request data about the roaming MS 290 from the HLR 230 for that MS 290. Concurrently, the HLR 230 will be informed in which MSC area the MS 290 has roamed into and will update its data accordingly. Therefore, if a call is placed from the MS 290, the VLR 250 will have the necessary information for the call setup without having to interrogate the HLR 230. Furthermore, the VLR will normally contain more specific information with regard to the MS location area, e.g., the serving BSC, BTS and sector information.

Figure 3:
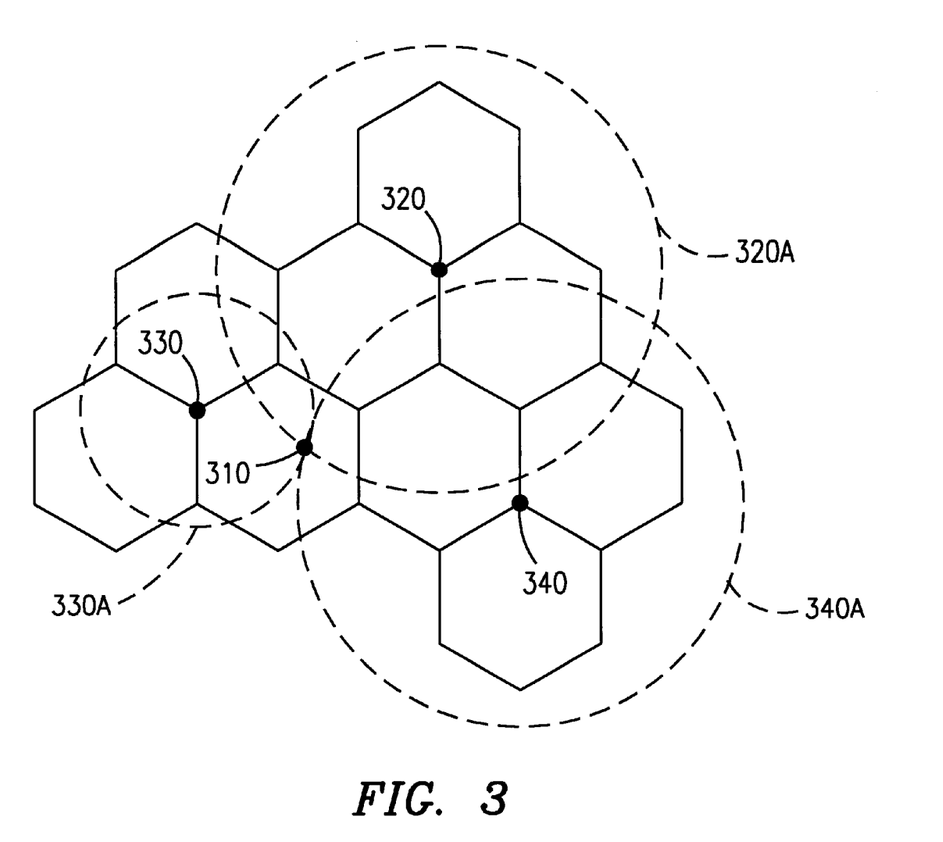
FIG. 3 illustrates a conventional three base station locating scenario as utilized in prior art mobile positioning systems.

With reference now to FIG. 3 there is shown a portion of the mobile network 200 representatively illustrated in FIG. 2, and configured, as FIGS. 1 and 2, in a preferred embodiment of the present invention. Each of BTSs 320, 330 and 340 produce a typical three-sectored cell, respectively, by use of antennas with pointing azimuths of 120 degrees. An MS 310 is being served by BTS 330, but is also within the communication ranges of BTSs 320 and 340. As is apparent from the respective circular distance traces 320A, 330A and 340A, MS 310 is located at the intersection of all three traces. Should one of the traces be absent, the ambiguity of position illustrated and discussed in connection with FIG. 1 would be introduced. Each of BTSs 320, 330 and 340 are under the control of a respective BSC (not shown), as illustrated and described hereinabove in connection with FIG. 2.

When the MS 290 of FIG. 2 or the MS 310 of FIG. 3 is to be positioned, the mobile network 200 receives a positioning request from some entity, e.g., the MS itself or some other entity within the Public Land Mobile Network (PLMN). This request is relayed to the BSC 270 in which the MS 290 is currently being served according to the appropriate HLR 230 and VLR 250 information. When the appropriate BSC 270 serving the MS 290 or 310 receives the positioning request, an attempt is made to locate two or more suitable BTSs so that triangulation techniques may be used for an accurate position evaluation. It is noted that the two suitable BTSs are in addition to the BTSs 330 already in communication with MS 310. For the current illustrative example, the BSC determines that BTSs 320 and 340 are within range for suitable communications with MS 310. At this point, the serving BSC commands MS 310 to transmit, e.g., an access burst, to each of the three BTSs 320, 330 and 340.

The elapsed time from transmission by the MS 310 to BTS reception is determined for each of BTSs 320, 330 and 340. This and similar measurements may be performed by any number of well known methods, e.g., in one GSM method Time Advance (TA) parameters are used, as is understood in the GSM arts, where the TA parameters are a measure of the elapsed time.

The TA data from each BTS is then forwarded to a Master Positioning Center (MPC), illustrated in FIG. 2 by the reference numeral 295. Based on the TA data, the MPC 295 determines the respective MS 310 distances from each of the three BTSs 320, 330 and 340. As is understood in the positioning arts, each distance evaluated for the associated BTS confines the MS 310 to a position circle circumscribing the respective BTS with a radius equivalent to the evaluated distance. Unlike the positional ambiguity of using two such measurements, as illustrated and described in connection with FIG. 1, when three such measurements are utilized, i.e., "triangulation", the MPC 295 can definitively position the MS 310 at the single, common intersection of the three circumscribing circles.

However, as discussed hereinbefore, an MS may often be within range of only two BTSs, as illustrated and described in connection with FIG. 1. For example, when the MS in FIG. 1 is actually located at point B, i.e., in cell 135, it is served by BTS 110. When a positioning request is received by the mobile network, routing information is obtained and the BSC currently serving the MS attempts to locate at least two suitable BTSs, in addition to BTS 110, for TA measurements. However, only BTS 120 along with the serving BTS 110 is determined to be with communication range of the MS at point B. The appropriate BSC then commands the MS to transmit to both BTSs 110 and 120. TA measurements are made and accordingly forwarded to the home MPC 295, as illustrated in FIG. 2. The MPC 295 then attempts to perform a position evaluation on the reported TA values. However, due to only two BTSs reporting TA data with respect to the MS position, the aforedescribed positional ambiguity arises, between points A and B, the intersections of the TA circles 110A and 120A, only one of which accurately reflects MS's 310 true position. It should be understood that with some positioning methods intersecting hyperbolas may be used instead of the circles illustrated herein.

To surmount this uncertainty, the improved system and method of the present invention has been developed. Upon receipt of the original request for a positioning calculation, a call setup is forwarded to the targeted MS. As a result of call establishment, the serving BTS 110 sector (with the MS at point B) is determined and information identifying the serving BTS 110 is stored as part of the standard location subscriber data in the VLR associated with the BTSs in which the MS is located. Location data identifying the BTS 110 sector serving the MS at point B is then forwarded from the visited network back to the home network where it is ultimately returned to the home MPC 295 for positional analysis. The MPC 295 then compares the two TA derived position estimates with the estimated coverage area of the identified BTS sector. Under normal circumstances, only one of the position estimates will be located within the identified serving BTS's estimated coverage area, as illustrated and described further below in connection with FIG. 4.

Figure 4:
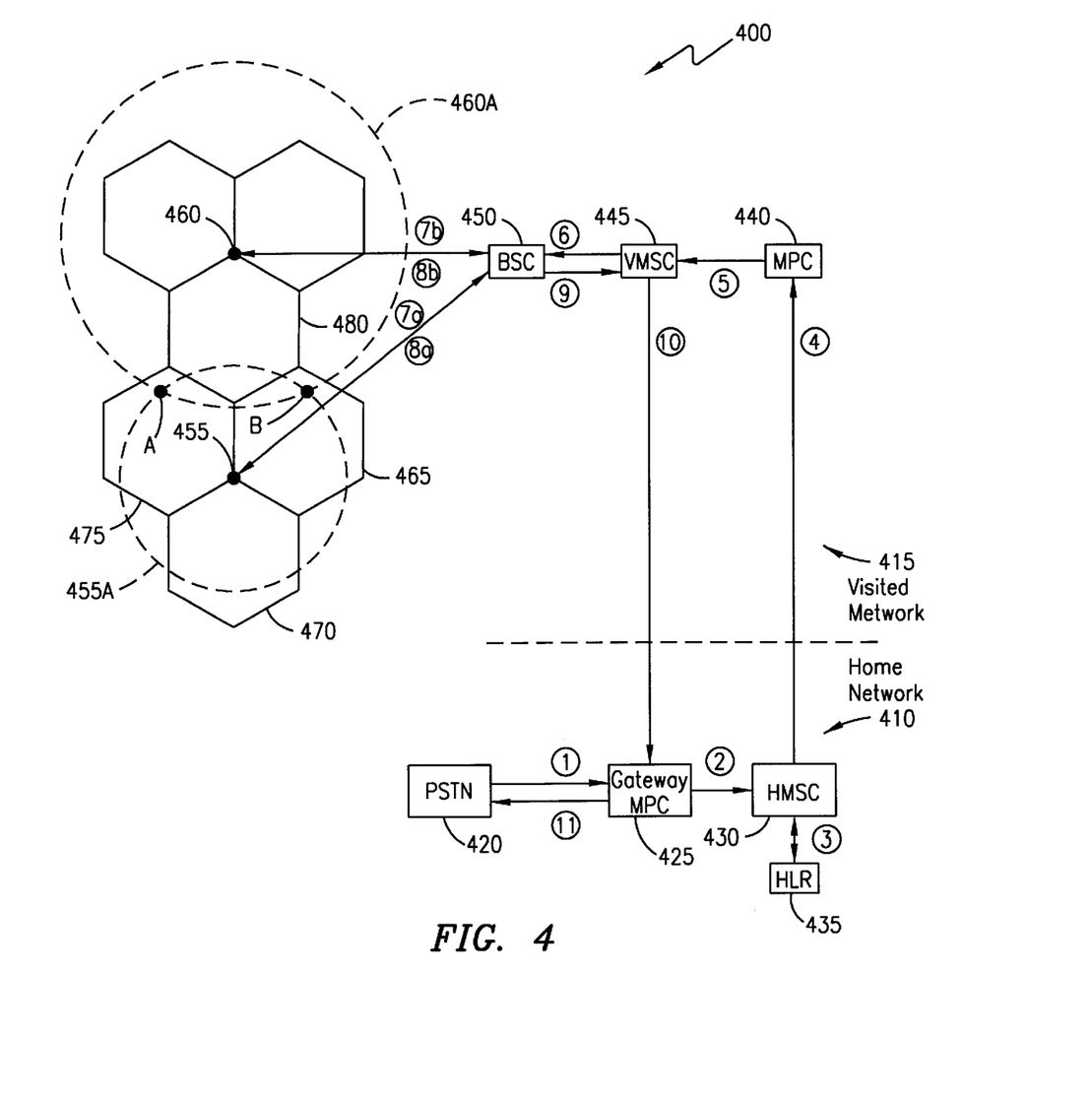
FIG. 4 illustrates two base stations as utilized by the mobile positioning system of a preferred embodiment.

FIG. 4 illustrates a mobile network, generally designated by the reference numeral 400, and an event chronology of a mobile positioning evaluation when only two BTSs and are available for gathering TA data on an MS 405 having a home network, generally designated by the reference numeral 410, and currently located in a visited network, generally designated by the reference numeral 415. In the present illustrative example, MS 405 is the targeted mobile on which a positioning request is made by an entity through a PSTN 420. For example, the requesting entity orders the positioning request, which is received at a home Gateway MPC 425 of the MS's home network 410 (step 1) and includes an order for a call setup with MS 405.

Gateway MPC 425 forwards the positioning request to a home MSC 430 (step 2) within the MS's home network 410. Home MSC 430 then interrogates an associated home HLR 435 (step 3) for current location information on the MS 405. Data records in the HLR 435 indicate that the MS 405 is currently located within the aforementioned visited network 415 and, thus, MSC 430 forwards the positioning request and the associated call setup command, pursuant to the preferred embodiment, to another MPC 440 (step 4) associated with the appropriate visited network 415. It should be understood that the MPC 440 may also serve as a gateway for the visited network 415. In either event, the MPC 440 then forwards the request to a visited MSC 445 (step 5), whereupon data records within the visited MSC 445 are interrogated to determine the particular BSC (of many) that is currently serving the MS 405. With reference back to step 3, gateway MPC 425 may itself interrogate the home HLR 435 and send the request (step 5) directly to the visited MSC 445.

A BSC 450 is determined to be the serving BSC for the MS 405 within the visited network 415, and is accordingly forwarded the aforementioned call setup and positioning instructions (step 6). BSC 450 thereupon identifies a particular BTS, i.e., BTS 455, as the serving base transceiver station (step 7a) and attempts to locate additional compatible BTSs with which to take TA measurements. The serving cell, or sector, is determined by an initial call setup, as is understood in the art. Of all the surrounding BTSs, only one other BTS is located from which TA measurements can be taken, i.e., BTS 460 (step 7b). Likewise, TA measurements are taken from the serving BTS 455.

The TA and serving sector data are then delivered to the BSC 450 (steps 8a and 8b) which successively forwards the data to the visited MSC 445 (step 9). The TA and service sector information are then returned to the MPC 440 (step 10) where distance calculations are determined from the TA data. At this point, if a distinct position is determined, the process would complete by returning the mobile position to the requesting entity (step 11). For example, if three or more TA measurements were obtained, the MS position would readily be pinpointed and forwarded back.

However, in the continuing example, an unequivocal position is not possible from the TA data alone, as indicated by distance traces 455A and 460A circumscribing BTSs 455 and 460, respectively. As shown in FIG. 4, BTS 455 covers cells 465, 420 and 475, and BTS 460 covers cells 480, 485 and 490. The positional ambiguity for MS 405 using only the two BTSs 455 and 460 is between point A located within cell 475 and point B located in cell 465, both cells being covered by BTS 455. It should be understood, however, that, as illustrated in FIG. 1, positional ambiguity may occur between two BTSs as well.

It should be understood, however, that since a call was setup substantially concurrently with the measurement of the TA data, the serving cell or sector 465 was determined to be the serving area of the BTS 455. This information which was retrieved from visited MSC 445 is then compared against the two possible calculated positions. Comparison results indicate that only position B can be within the serving cell 465, thereby resolving the positional uncertainty. The final position calculation is then returned to the requesting entity (step 11).

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A telecommunications system for determining the location of a mobile station therein, said telecommunications system comprising:
    a serving base transceiver station in radio communication with said mobile station, said mobile station having a call connection through said serving base transceiver station;
    a second base transceiver station in radio communication with said mobile station; and
    positioning means for positioning said mobile station within said telecommunications system using location data and resolving positional ambiguities using cell-related area information associated with said call connection, said location data comprising serving location data from said serving base transceiver station and other location data from said second base transceiver station.

2. A telecommunications system according to claim 1, wherein said location data from said serving and second base transceiver stations comprise timing advance data.

3. A telecommunications system according to claim 1, wherein said positioning means comprises a master positioning center, said serving and second base transceiver stations forwarding said serving and other location data, respectively, to said master positioning center, said serving base transceiver station further forwarding the cell-related area information to said master positioning center, the cell-related area information determined by the call connection to said serving base transceiver station.

4. A telecommunications system according to claim 3, wherein said master positioning center, said serving and second base transceiver stations and said mobile station are within a home mobile network of said telecommunications system.

5. A telecommunications system according to claim 3, wherein said master positioning center is within said home mobile network, and said serving and second base transceiver stations are within a visitor mobile network.

6. A telecommunications system according to claim 1, further comprising:
    a base station controller for controlling said serving and second base transceiver stations, said base station controller forwarding said location data from said serving and second base transceiver stations to said positioning means.

7. A telecommunications system according to claim 1, further comprising:
    a first and second base station controller for respectively controlling said serving and second base transceiver stations, said respective base station controller forwarding said serving and other location data to said positioning means.

8. The telecommunications system according to claim 1, wherein the cell-related area information identifies a cell served by said serving base transceiver station serving said mobile station.

9. The telecommunications system according to claim 1, wherein the cell-related area information identifies a sector within a cell served by said serving base transceiver station serving said mobile station.

10. The telecommunications system according to claim 1, wherein the cell-related area information identifies a predefined portion of a cell known to the telecommunications system served by said serving base transceiver station serving said mobile station.

11. In a telecommunications system, a method for determining the location of a mobile station therein, said method comprising the steps of:

requesting a location update on said mobile station;

retrieving, from a serving base transceiver station in communication with said mobile station, serving location data and cell-related area information on the location of said mobile station, said mobile station having a call connection through said serving base transceiver station;

retrieving, from a second base transceiver station in communication with said mobile station, other location data on the location of said mobile station; and determining, from location data on said mobile station, the location of said mobile station within said telecommunications system, said location data including said serving location data from said serving base transceiver station and said other location data from said second base transceiver station, said retrieved cell-related area information being used to resolve positional ambiguities during said step of determining.

12. The method according to claim 11, wherein said step of requesting comprises:

requesting, by a requesting entity within a Public Switched Telephone Network, said location update through a gateway mobile switching center within said telecommunications system.

13. The method according to claim 12, wherein said gateway mobile switching center, said serving and second base transceiver station and second mobile station are within a home mobile network of said telecommunications system, said location update request remaining within said home mobile network.

14. The method according to claim 12, wherein said gateway mobile switching center is within a home mobile network, and said serving and second base transceiver station and said mobile station are within a visitor mobile network, said location update request being forwarded from said home mobile network to said visitor mobile network.

15. The method according to claim 11, wherein said step of requesting comprises:

requesting, by said mobile station, said location update.

16. The method according to claim 11, wherein the cell-related area information identifies a cell served by said serving base transceiver station serving said mobile station.

17. The method according to claim 11, wherein the cell-related area information identifies a sector within a cell served by said serving base transceiver station serving said mobile station.

18. The method according to claim 11, wherein the cell-related area information identifies a predefined portion of a cell known to the telecommunications system and served by said serving base transceiver station serving said mobile station.

19. A telecommunications system for determining the position of a mobile station, said telecommunications system comprising:

means for requesting a location update on said mobile station;

means for retrieving, from a serving base transceiver station in communication with said mobile station, serving location data and cell-related area information of the location of said mobile station, said mobile station having a call connection through said serving base transceiver station;

means for retrieving, from a second base transceiver station in communication with said mobile station, other location data of the location of said mobile station; and means for determining, from location data of said mobile station, the location of said mobile station within said telecommunications system, said location data comprising said serving location data from said serving base transceiver station and said other location data from said second base transceiver station, said means for determining the location of said mobile station resolving positional ambiguities using the retrieved cell-related area information.

20. The telecommunications system according to claim 19, wherein said means for requesting comprises:

a requesting entity within a Public Switched Telephone Network for requesting location update through a gateway mobile switching center within said telecommunications system.

21. The telecommunications system according to claim 20, wherein said gateway mobile switching center, said serving and second base transceiver station and second mobile station are within a home mobile network of said telecommunications system, said location update request remaining within said home mobile network.

22. The telecommunications system according to claim 20, wherein said gateway mobile switching center is within a home mobile network, and said serving and second base transceiver station and said mobile station are within a visitor mobile network, said location update request being forwarded from said home mobile network to said visitor mobile network.

23. The telecommunications system according to claim 19, wherein said means for requesting comprises:

a requesting entity within said mobile station that requests said location update.

24. The telecommunications system according to claim 19, wherein the cell-related area information is an identification of a predefined portion of a cell served by said serving base transceiver station, an identification of a sector within a cell served by said serving base transceiver station, or an identification of a cell served by said serving base transceiver station.

25. A method for determining the position of a mobile station within a telecommunications system, said method comprising the steps of:

receiving a positioning request for the mobile station;

identifying a serving base transceiver station and at least one other base transceiver station;

setting up an initial call connection to the serving base transceiver station;

retrieving location data from the serving base transceiver station and the at least one other base transceiver station;

retrieving, from the serving base transceiver station, geographically-related information associated with the initial call connection; and forwarding the location data and the geographically-related information to a mobile positioning center where distance calculations are determined from the location data and positional ambiguities are resolved using the geographically-related information associated with the initial call connection.

26. The method according to claim 25, wherein said location data comprises time advance (TA) parameters.

27. The method according to claim 25, further comprising prior to said step of identifying, the step of:

determining a base station controller serving the mobile station.

28. The method according to claim 25, wherein the geographically-related information associated with the initial call connection comprises cell-related area information.

29. The method according to claim 28, wherein the cell-related area information is an identification of a pre-defined portion of a cell served by said serving base transceiver station, an identification of a sector within a cell served by said serving base transceiver station, or an identification of a cell served by said serving base transceiver station.

30. An arrangement for determining the position of a mobile station, said arrangement comprising:

a mobile switching center (MSC);

a mobile positioning center (MPC) in communication with said MSC for forwarding a received positioning request to said MSC;

a base station controller (BSC) currently serving the mobile station, said BSC receives positioning instructions associated with the received positioning request from said MSC; and at least two base transceiver stations serving the mobile station that are controlled by said BSC, said at least two base transceiver stations taking time advance measurements and one of said at least two base transceiver stations initiating a call to the mobile station and retrieving cell-related area information, said time advance measurements and the cell-related area information at least two base transceiver stations serving the mobile station that are controlled by said BSC, said at least two base transceiver stations taking time advance measurements and one of said at least two base transceiver stations initiating a call to the mobile station and retrieving cell-related area information, said time advance measurements and the cell-related area information being sent to the MPC where distance calculations are determined from the TA measurements and position ambiguities are resolved from the cell-related area information.

31. The arrangement according to claim 30, further comprising:

a home location register (HLR) and a visitor location register (VLR) both operable to keep track of the area in which the mobile station currently resides and inform said MSC of the area in which the mobile station currently resides.

32. The arrangement according to claim 31, wherein said MSC, said HLR and said MPC are within a home network of said mobile station, said BSC and said at least two base transceiver stations are within a visitor network.

33. The arrangement according to claim 30, wherein said MSC, said MPC, said BSC and said at least two base transceiver stations are within a home network of the mobile station.

* * * * *

UNITED STATES PATENT AND TRADEMARK OFFICE
CERTIFICATE OF CORRECTION

PATENT NO.     : 6,477,379 B2                                              Page 1 of 1
DATED          : November 5, 2002
INVENTOR(S)    : Christopher Hugh Kingdon It is certified that error appears in the above-identified patent and that said Letters Patent is hereby corrected as shown below:

Column 11, line 34 - Column 12, line 6,
Delete "at least two base transceiver stations serving the mobile station that are controlled by said BSC, said at least two base transceiver stations taking time advance measurements and one of said at least two base transceiver stations initiating a call to the mobile station and retrieving cell-related area information, said time advance measurements and the cell-related area information"

Signed and Sealed this

Sixth Day of May, 2003

JAMES E. ROGAN
*Director of the United States Patent and Trademark Office*